United States Patent
Martin et al.

[11] Patent Number: 6,065,361
[45] Date of Patent: May 23, 2000

[54] GEAR SYSTEM WITH GEARS SELECTIVELY LOCKED WITH SHAFT

[75] Inventors: William Wesley Martin, South Perth; Michell Newton, Killarney Heights, both of Australia

[73] Assignee: Preload International Limited, Tortola, Virgin Islands (Br.)

[21] Appl. No.: 09/101,755

[22] PCT Filed: Jan. 17, 1997

[86] PCT No.: PCT/AU97/00024

§ 371 Date: Jul. 16, 1998

§ 102(e) Date: Jul. 16, 1998

[87] PCT Pub. No.: WO97/26468

PCT Pub. Date: Jul. 24, 1997

[30] Foreign Application Priority Data

Jan. 19, 1996 [AU] Australia ................... PN7642
Mar. 27, 1996 [AU] Australia ................... PN8953

[51] Int. Cl.[7] ............................................. F16H 3/08
[52] U.S. Cl. ........................ 74/371; 74/372; 192/84.3
[58] Field of Search ........................ 74/369–372, 337; 280/238, 260; 192/84.3, 49.91

[56] References Cited

U.S. PATENT DOCUMENTS

| 1,133,925 | 3/1915 | Burt ............................................. 74/371 |
| 1,597,944 | 8/1926 | Wilson et al. . |
| 4,716,777 | 1/1988 | Hartmann . |
| 5,404,768 | 4/1995 | Hwang et al. ............................. 74/371 |
| 5,537,888 | 7/1996 | Pusic . |
| 5,542,310 | 8/1996 | Lee . |
| 5,611,556 | 3/1997 | Davidow ............................... 74/372 X |
| 5,862,903 | 1/1999 | Gruden et al. ...................... 192/84.3 X |

FOREIGN PATENT DOCUMENTS

| 3243431A | 5/1984 | Germany . |
| 0 6209073 | 2/1996 | Japan . |
| 1024830 | 2/1958 | Netherlands . |
| 2183751A | 6/1987 | United Kingdom . |
| WO 93/09992 | 5/1993 | WIPO . |

*Primary Examiner*—David A. Bucci
*Assistant Examiner*—Marcus Charles
*Attorney, Agent, or Firm*—Reising, Ethington, Barnes, Kisselle, Learman & McCulloch, P.C.

[57] ABSTRACT

A gear system characterized by providing at least one gear-wheel (58a) about a shaft (34), the shaft (34) having as least one pawl member (84) located therein, the or each pawl member (84) being caused to move into and out of engagement with a gear-wheel (48a) normally rotating freely with respect to the shaft (34) passing therethrough by the positioning of a roving magnet (48) withing the shaft, the engagement of the pawl member (84) with the gear-wheel (48a) thereby causing that gear-wheel (48a) to rotate with the shaft (34).

17 Claims, 6 Drawing Sheets

GEAR SYSTEM WITH GEARS SELECTIVELY LOCKED WITH SHAFT

FIELD OF THE INVENTION

The present invention relates to an improved gear system. More particularly, the improved gear system of the present invention is intended for, but is not limited to, use on bicycles and similar conveyances presently utilising gears and gear levers.

DISCUSSION OF THE PRIOR ART

At present, bicycles typically employ a gear system known as the Derailleur system. This system usually comprises two or more large sprocket wheels, rigidly associated to the pedal-crank. A "derailer" or gear lever is manipulated by a rider to locate the chain about one or other of the pedal-crank sprocket wheels. A further "derailer" or gear lever is manipulated by the rider to locate the chain about one of several sprocket wheels rigidly associated with a rear wheel. The ratio between the diameter of the chosen pedal-crank sprocket and the chosen rear-wheel sprocket determining the gear ratio.

The above described prior art gear system requires significant maintenance in that the gears are fragile and are exposed to moisture and grit. Further, the size of the sprockets used is limiting physically and reduces ground clearance under the bicycle. The Derailleur system was not originally intended for "mountain bike" use.

Further disadvantages of the prior art gear systems are the need for at least two index cables, it is not possible to change gear when stationary and gear ratios are duplicated within the gear range. For example, a 21 speed Derailleur gear system has 10 duplicated gears.

The improved gear system of the present invention has as one object thereof to overcome substantially the above-mentioned problems associated with the prior art.

BRIEF DESCRIPTION OF THE INVENTION

In accordance with the present invention there is provided an improved gear system characterised by providing at least one gear-wheel about a shaft, the shaft or gear-wheel having at least one pawl member located therein, the or each pawl member being caused to move into and out of engagement with either the gear-wheel normally rotating freely with respect to the shaft passing therethrough or with the shaft passing therethrough and about which the gear-wheel normally rotates freely, the engagement of the or each pawl member with the gear-wheel or the shaft thereby causing that gear to rotate with the shaft, wherein the movement of the or each pawl member is governed magnetically.

Preferably, a roving magnet is provided within the shaft and the or each pawl member is magnetised in a manner whereby positioning of the roving magnet directly alongside the pawl member causes that pawl member to be repulsed or attracted by the roving magnet and to either project partially from the shaft and into a recess provided in the gear-wheel or to project partially from the gear-wheel and into a recess provided in the shaft.

At least a pair of pawl members are preferably provided in the shaft for engagement with each of the gear-wheels associated therewith.

In accordance with the present invention there is further provided an improved gear system characterised by a pair of substantially parallel shafts, each shaft having provided thereabout at least two gear-wheels, at least one of the gear-wheels being fixed with respect to its shaft and at least one being able to rotate freely thereabout, the gear-wheels on each shaft being arranged so as to engage the gear-wheels on the other shaft, thereby forming gear-wheel pairs, wherein a rotary force applied to one shaft is transferred to the other shaft through the gear-wheels associated therewith and under the influence of a roving magnet provided within one or both shafts, the positioning of which is determined by a user, the or each roving magnet causing one or more pawl members provided in the or each shaft adjacent each free gear-wheel to move into and out of engagement therewith, the free gear-wheels being caused to rotate with the shaft when engaged by the or each pawl member associated therewith.

Preferably, a free or pawl gear-wheel is provided on one shaft adjacent a fixed gear-wheel on the other shaft such that if the or each pawl member associated with that free gear-wheel are not engaged therewith, the free gear-wheel will be caused to rotate freely about the shaft about which it is provided.

At least a proportion of the gear-wheel pairs are preferably provided such that each gear-wheel is of a differing diameter so as to provide a gear-ratio therebetween. A single gear-wheel pair may be provided of the same diameter, preferably at or near the centre of a gear range.

The gear-wheels are preferably provided in a casing or housing. The shafts are preferably mounted in the housing by way of bearing means so as to be held rotatably with respect thereto.

Still preferably, each shaft is provided with a plurality of fixed gear-wheels and pawl gear-wheels located thereabout. The roving magnet in each shaft having a guide cable attached thereto and through which a user may control the position thereof with respect to each shaft and the gear-wheels provided thereabout, which in turn allows the user to control the gear ratio to be employed between the two shafts.

The housing preferably contains a volume of lubricant to lubricate the gear-wheels in operation.

The improved gear-system may preferably be applied to a pedal driven conveyance having a pedal-crank and one or more driven wheels, one shaft having a fixed gear-wheel provided at a free end thereof, this gear-wheel cooperating directly or indirectly with a complementary gear-wheel provided on or with respect to the pedal-crank. The other shaft preferably having at least one fixed gear-wheel provided at or adjacent a free end thereof and cooperating directly with a complementary gear-wheel provided on or with respect to a hub of a driven wheel.

DESCRIPTION OF THE DRAWINGS

The improved gear system of the present invention will now be described, by way of example only with reference to one embodiment thereof and the accompanying drawings, in which.

DESCRIPTION

Figure 1:
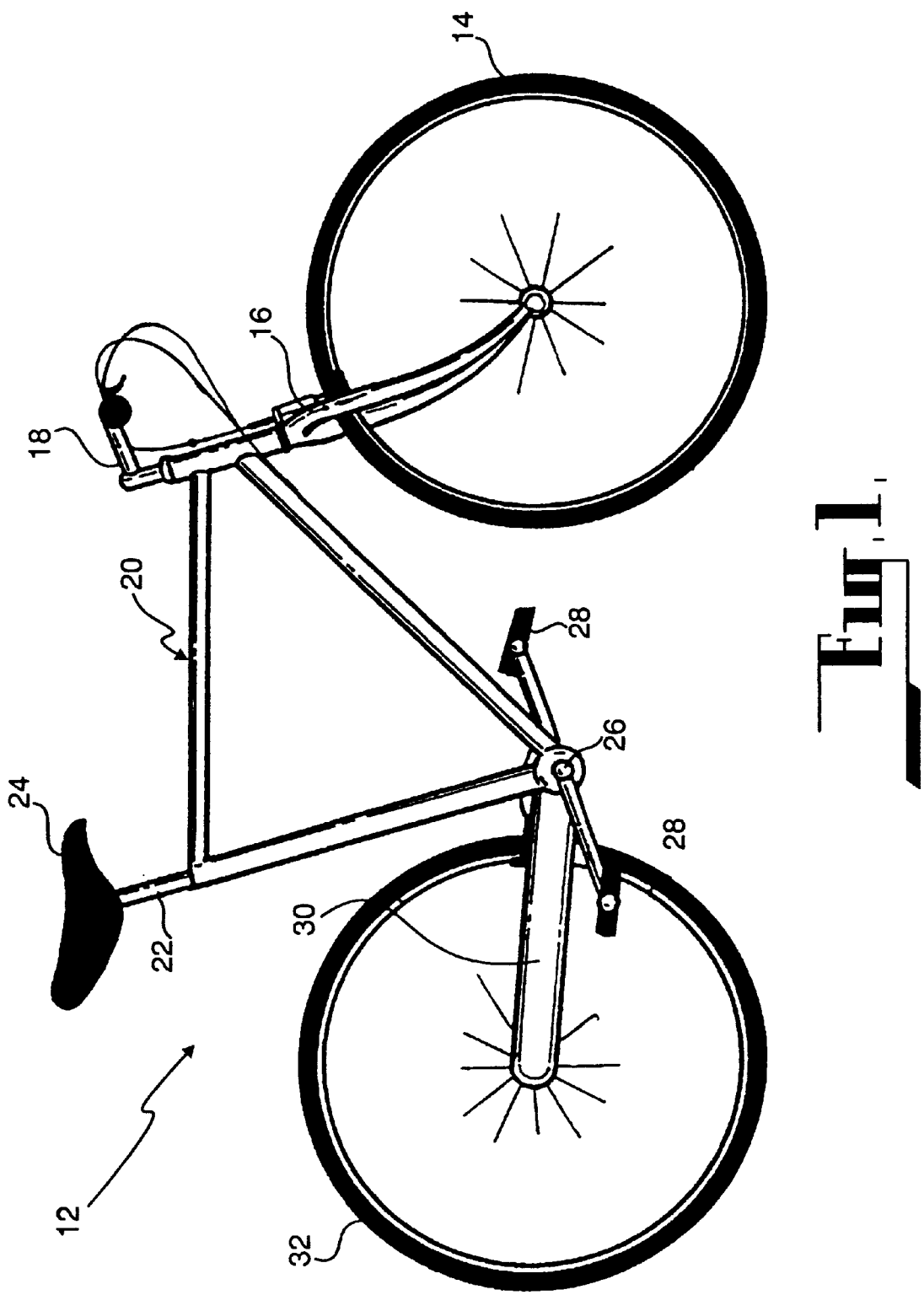
FIG. 1 is a diagrammatic representation of a bicycle to which an improved gear system in accordance with one embodiment of the present invention has been applied.

In FIG. 1 there is shown an improved gear system 10 in accordance with the present invention in position on a bicycle 12. The bicycle 12 comprises a front wheel 14, forks 16, handle bars 18 and a frame 20. The frame 20 receiving therein a neck of the forks 16, a seat post 22 supporting a saddle 24 and a pedal-crank 26. The pedal-crank 26 is provided with a pair of pedals 28.

The improved gear system 10 comprises a casing 30 rigidly connected to the frame 20 adjacent the pedal-crank 26. The casing 30 supports an axle (not shown) of a rear wheel 32.

Figure 2:
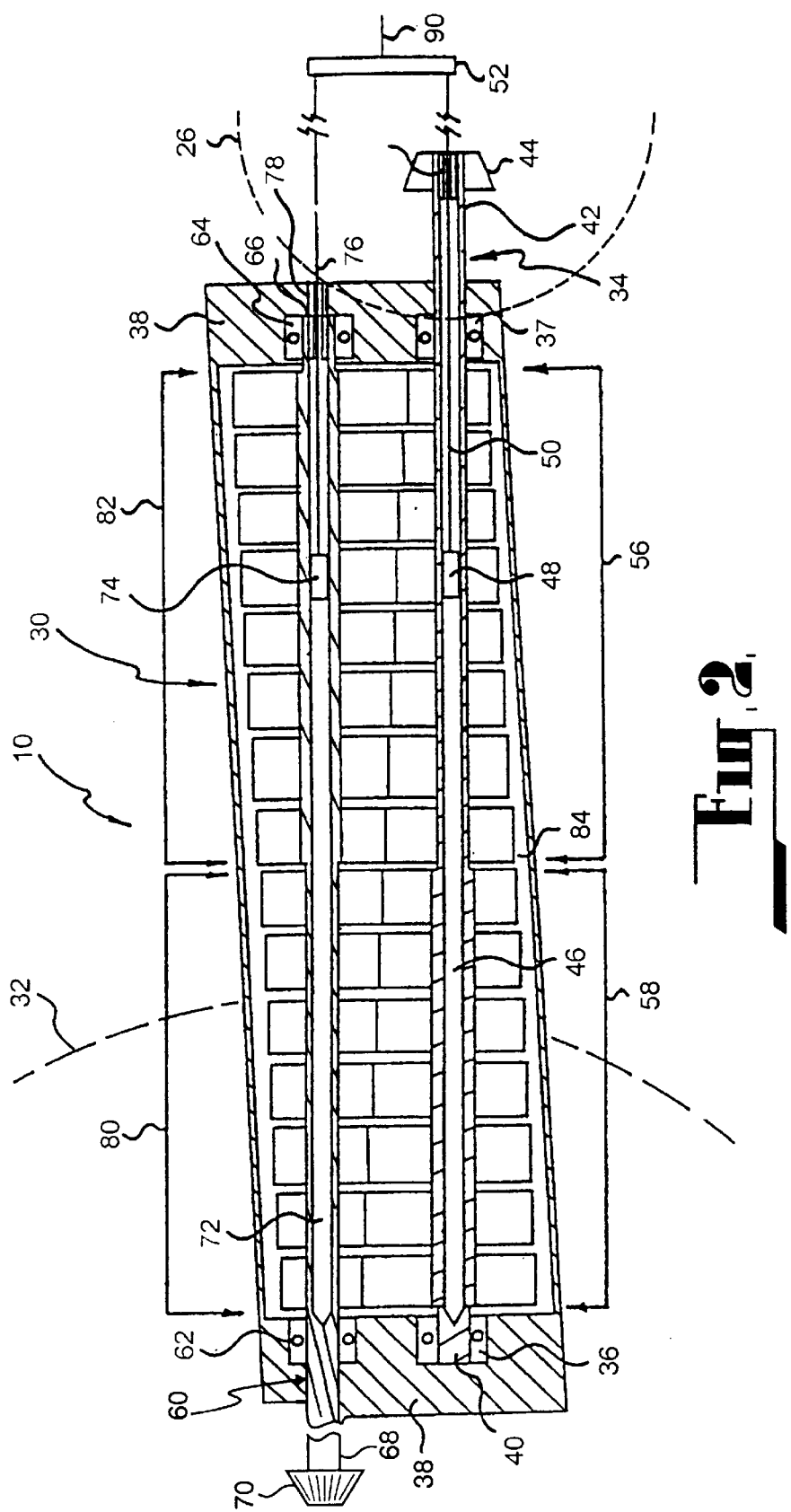
FIG. 2 is a cross-sectional view through the improved gear system of FIG. 1 showing the two shafts thereof with fifteen gear-wheel pairs provided thereon and having a casing or housing of the gear system shown in part.

In FIG. 2 there is shown the casing 30 in part and in section. A first shaft 34 is mounted in the casing 30 by way of bearing means, for example single row ball bearings 36 and 37. The ball bearings 36 and 37 are rigidly located in end portions 38 of the casing 30. The first shaft 34 has a first end 40 received and held within the ball bearing 36. A free or second end 42 of the shaft 34 has rigidly located thereabout a bevel gear-wheel 44, such that upon rotation of the bevel gear 44 the firm shaft 34 also rotates.

The first shaft 34 has a hollow bore 46 blind at the first end 40 of the first shaft 34 but open at the second end 42. A roving magnet 48 is located within the bore 46 in a manner such that it may travel the length thereof and the roving magnet 48 is proportioned accordingly. The roving magnet 48 has a guide cable 50 attached thereto and extends through the bore 46 therefrom and further through the second end 42 of the first shaft 34. The guide cable 50 extends to an index member 52 to which it is rigidly but adjustably connected. An annular bush 54 is provided within the bore 46 adjacent the second end 42 and through which the guide cable 50 extends. The bush 54 acts as a seal and aids in the smooth travel of the guide cable 50, thereby preventing wear of the guide cable 50 and the first shaft 34.

A series of fixed gear-wheels 56 are provided about the first shaft 34 in a manner whereby such rotate directly upon rotation of the first shaft 34 as they are fixedly connected thereto: One fixed gear-wheels 56 are provided towards the second end 42 of the first shaft 34 and increase in diameter from the second end 42 towards the first end 40. A series of pawl gear-wheels 58 are provided about the first shaft 34 in a manner whereby such can freely and independently rotate about the first shaft 34 as such are not at all times fixedly connected thereto.

A second shaft 60 is mounted in the casing 30 by way of bearing means, for example single row ball bearings 62 and 64. The ball bearings 62 and 64 are rigidly located in the end portions 38 of the casing 30 are arranged such that the shafts 34 and 60 are substantially parallel. The second shaft 60 has a first end 66 received and held within the ball bearing 64. A free or second end 68 of the shaft 60 has rigidly located thereabout a bevel gear-wheel 70, such that upon rotation of the second shaft 60 the bevel gear 70 also rotates.

The second shaft 60 has a hollow bore 72 blind at the second end 68 of the second shaft 60 but open at the first end 66. A roving magnet 74 is located within the bore 72 in a manner such that it may travel the length thereof and the roving magnet 74 is proportioned accordingly. The roving magnet 74 has a guide cable 76 attached thereto and extends through the bore 72 therefrom and through the first end 66 of the second shaft 60. The guide cable 76 extends to index member 52 to which it is rigidly but adjustably connected. An annular bush 78 is provided within the bore 72 adjacent the second end 66 and projects through a portion of the end portion 38 of the casing 30. The bush 78 acts as a seal and aids in the smooth travel of the guide cable 76, thereby preventing wear of the guide cable 76 and the second shaft 60.

It is envisaged that the roving magnets 48 and 74 may be provided in the form of neodymium rare earth magnets although such is rot considered to limit the scope of the present invention.

A series of fixed gear-wheels 80 are provided about the second shaft 60 in a manner whereby such rotate directly upon rotation of the second shaft 60 as they are fixedly connected thereto. The fixed gear-wheels 80 are provided towards the second end 68 of the second shaft 60 and increase in diameter from the second end 68 towards the first end 66. A series of pawl gear-wheels 82 are provided about the second shaft 60 in a manner whereby such can freely and independently rotate about the second shaft 60 as such are not at all times fixedly connected thereto.

The gear-wheels 56, 58, 80 and 82 are housed within the casing 30 in a chamber 84. The chamber 84 is provided with a volume of lubricant (not shown). The casing 30 is arranged on the bicycle 12 of FIG. 1 such that the bevel gear-wheel 44 of the first shaft 34 engages a gear-wheel provided on the pedal-crank 26, shown in phantom generally in FIG. 2. Accordingly, drive imparted by a rider (not shown) through the pedal-crank 26 is transferred to the first shaft 34 which is caused to rotate. It is to be understood that the casing 30 preferably covers or encloses the bevel gear-wheels 44 and 70. As such, the casing 30 may have appropriate apertures provided therein to allow access thereinto by the gear-wheels provided on the pedal-crank 26 and the rear axel.

The gear-wheels 56 and 58 provided on the first shaft 34 engage a complementary gear-wheel 80 or 82 on the second shaft 60. In this manner gear-wheel pairs are provided and result in drive from one shaft being transferable to the other shaft. A gear-wheel pair is comprised of one fixed gear-wheel and a pawl gear-wheel. The relative diameters of the fixed and pawl gear-wheels in a pair determine the gear ratio provided by that gear-wheel pair.

The bevel gear-wheel 70 provided on the second end 68 of the second shaft 60 engages a gear-wheel provided on an axel of the hub of the rear wheel 32, shown in phantom in FIG. 2. In this manner, drive transferred from the first shaft 34 to the second shaft 60 is in turn transferred to the rear wheel 32.

Figure 3:
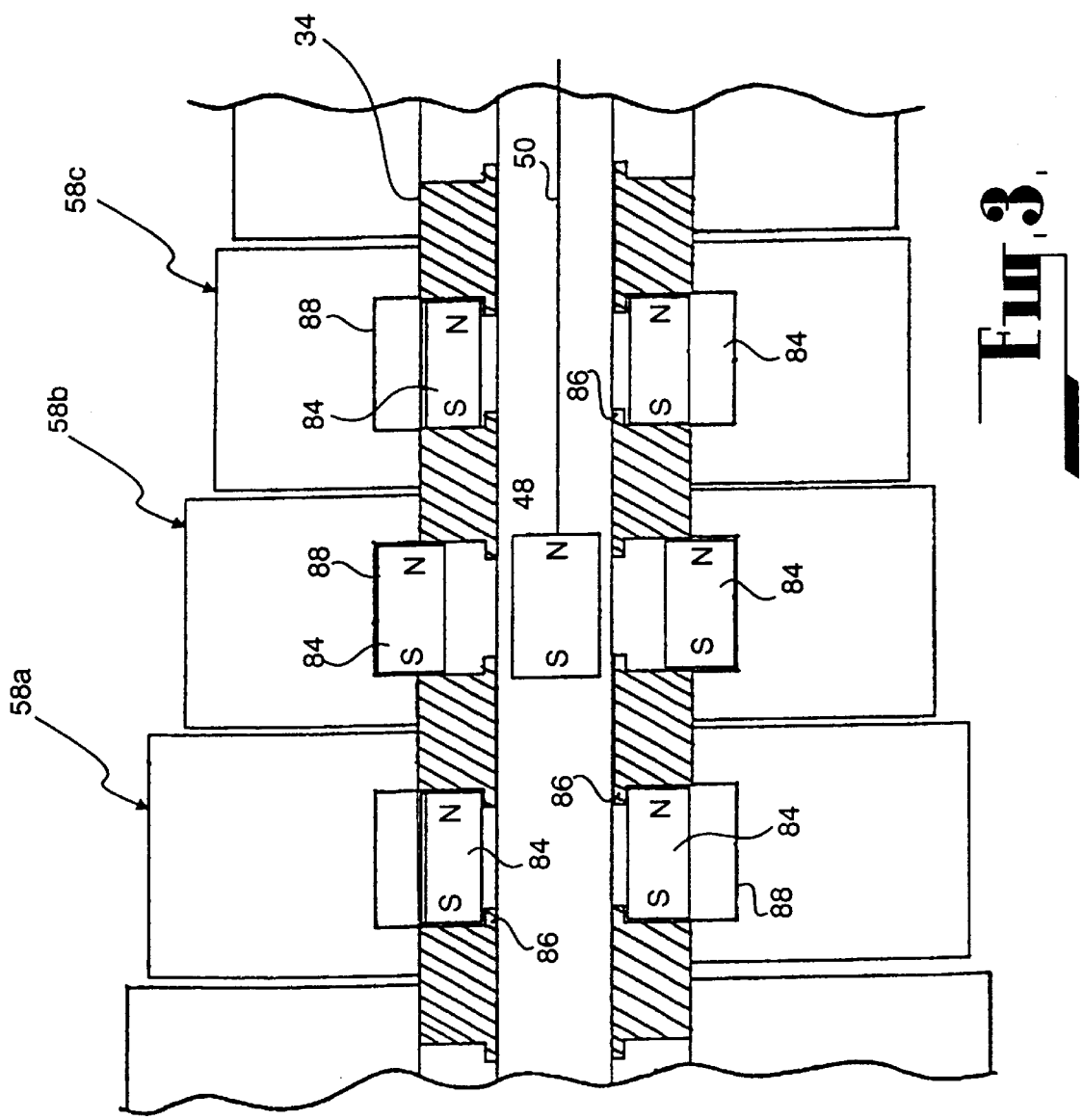
FIG. 3 is a cross-sectional view through a portion of a single shaft showing the roving magnet contained therein and the pawl members associated with one gear-wheel engaged therewith.
Figure 5:
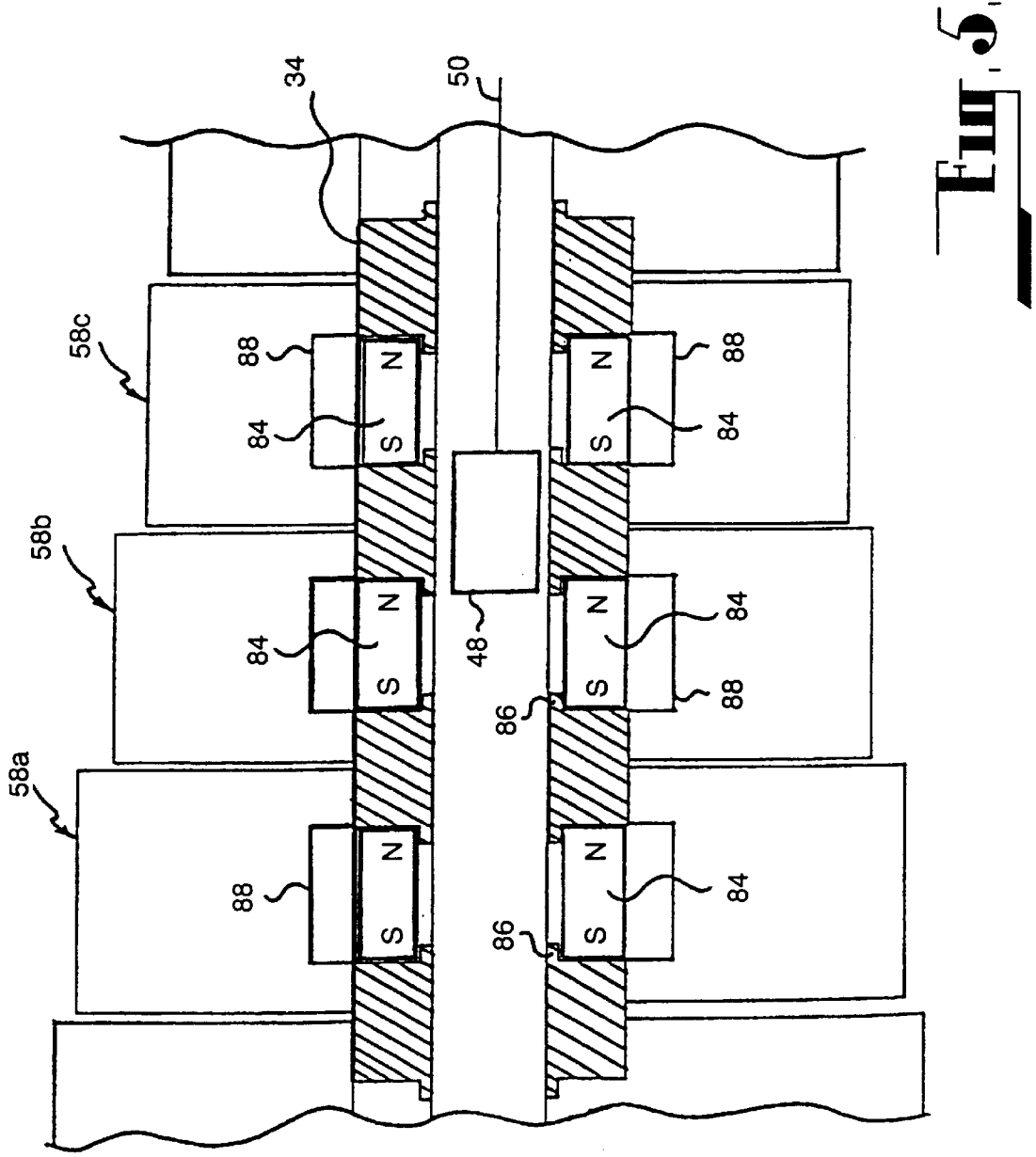
FIG. 5 is a cross-sectional view in accordance with FIG. 3 showing the roving magnet moving from being adjacent to one pair of pawl members.

In FIGS. 3 and 5 there are shown a number of pawl gear-wheels 58a, 58b and 58c provided about the first shaft 34. It is to be understood that operation of the pawl gear-wheels 22 is substantially similar. Each pawl gear-wheel 58a, 58b and 58c is able to rotate freely about the first shaft 34 when a pawl member 84 is positioned within the first shaft 34, as shown in FIG. 3 with reference to pawl gear-wheels 58a and 68c. The pawl members 84 are retained on a seat 86 and are dimensioned so as to not interfere with rotation of the pawl gear-wheels 58a and 58c thereabout.

The pawl members 84, for example, are provided in the form of neodymium rare earth magnets set in a titanium base or casing for added strength, the north and south poles thereof being provided longitudinally with respect to the first shaft 34. The north and south poles of the roving magnet 48 are provided in similar orientation, as can be seen in FIGS. 3 and 5. The pawl gear-wheels 58a, 58b and 58c are each provided with a pair of recesses 88 that correspond largely with the dimensions of the pawl members 84 although they are somewhat shallower such that upon movement of a pawl member 84 from its seat 86 into the recess 88 it is still partially retained within the first shaft 34, as is shown in FIG. 3. Consequently, the first shaft 34 and pawl gear-wheel 58b rotate together and act to transfer drive to the second shaft 60 through the fixed gear 80 paired with the pawl gear-wheel 58b.

Figure 4:
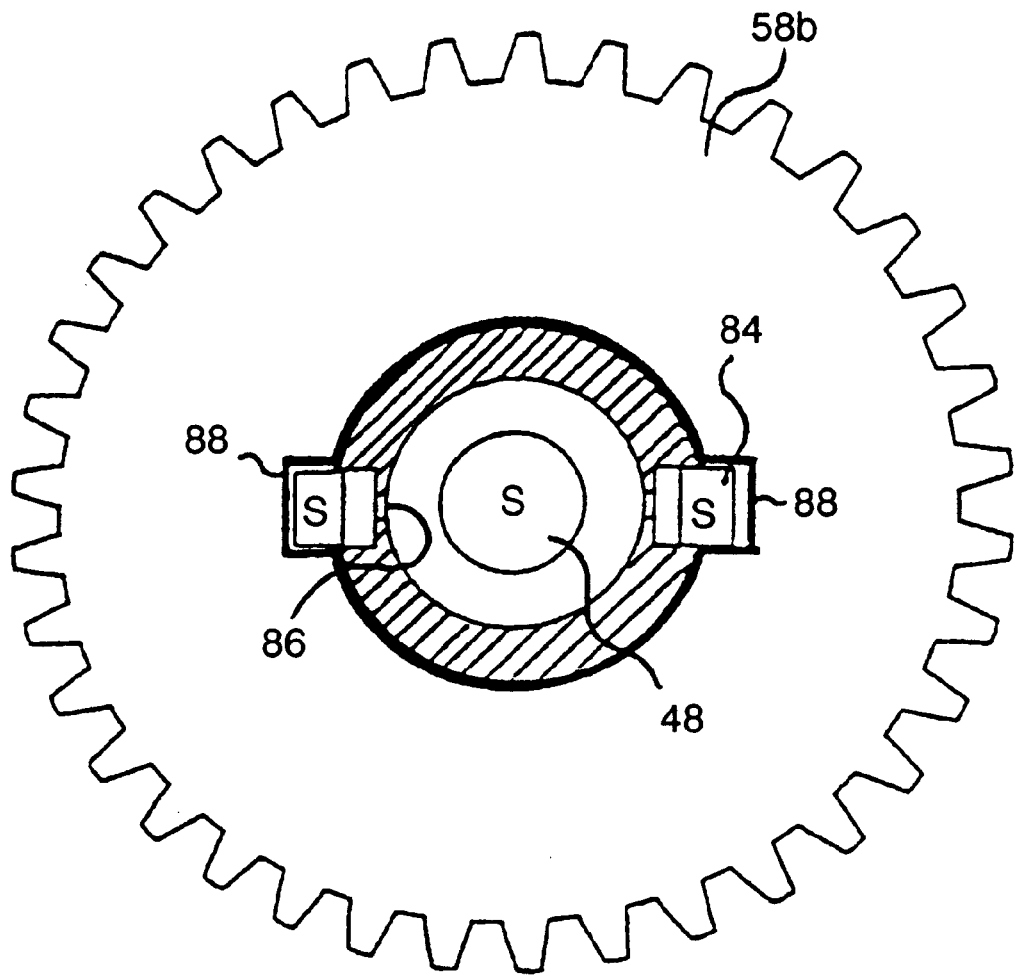
FIG. 4 is an end view of one shaft showing a single gear-wheel thereabout and the roving magnet therein causing the pair of pawl members associated with that gear-wheel to engage same.

In FIG. 4 there is shown the pawl gear-wheel 58b of FIG. 3 having the pawl members 84 engaging the pair of recesses 88 provided therein. The roving magnet 48 is aligned like-pole to like-pole with the pawl members 84 of the pawl gear-wheel 58b.

The subsequent magnetic repulsion between the like-poles of the roving magnet 48 and the pair of pawl members 84 causes those pawl members 84 to engage the recesses 88 in the pawl gear-wheel 58b.

As the roving magnet 48 is caused to move away from the pawl gear-wheel 58b through operation of the index member 52 by a rider the pawl members 84 are drawn to be seated against their seats 86 within the first shaft 34 as the dissimilar poles of the roving magnet 48 and pawl Members 84 attract as is shown in FIG. 5. In this manner the pawl members 84 are retained within the shaft until the roving magnet is aligned directly therewith.

The Index member 52 shown in FIG. 2 is provided with a gear selection cable, for example an index cable 90 extending therefrom to a point, preferably the handle bars 18, of the bicycle 12 from which the rider thereof may manipulate movement thereof. The roving magnets 48 and 74 are arranged on the guide cables 50 and 76 such that they are essentially opposed, as can be seen with reference to FIG. 2. Manipulation of the index cable 90 produces equal travel in both guide cables 50 and 76.

In use, the rider of the bicycle 12 will select a gear ratio for the cycling conditions experienced. For example, a gear ratio of 1:2 may be provided in a gear-wheel pair between a fixed gear 56 provided on the first shaft 34 and a pawl gear-wheel 82 provided on the second shaft 60. Such a ratio is Ideal for moving uphill or for moving away from a start. Alternatively, a gear ration of 1:1 is perhaps most appropriate for moving along a substantially flat surface and a gear ration of 2:1 between a pawl gear-wheel provided on the first shaft 34 and a fixed gear-wheel 80 provided on the second shaft 60 is most appropriate for movement downhill.

Using the abovenoted ratios between fixed gear-wheels and pawl gear-wheels the improved gear system 10 of the present invention will provide an overall gear ratio of 4:1. This overall ratio may be adjusted to a rider's specification. For example, if the rider desires an overall gear ratio of 5:1 then a gear ratio between the gear-wheels provided on the shafts 34 and 60 ranging from 2.5:1 to 1:2.5 will provide such an overall ratio.

Upon the rider choosing a preferred gear ratio the index cable 90 will be manipulated by the user to locate the roving magnets 48 and 74 adjacent the gear-wheel pair of the desired ratio. As the roving magnet is drawn away from the gear-wheel pair presently employed the pawl members 84 engaging the pawl gear-wheel are drawn within the shaft on which they are provided to seat against the seat 86. This action is caused by the attraction of the opposite-poles between the roving magnet and the pawl members 84. Such an arrangement is shown in FIG. 5 with reference to the first shaft 34. With reference to FIG. 3, as the roving magnet 48 becomes aligned with the pawl gear-wheel 58b of the gear-wheel pair providing the desired gear ratio the like-poles of the roving magnet 48 and the pawl members 84 cause those pawl members 84 associated with the pawl gear-wheel 58b to be repelled and subsequently be received within the recesses 88 provided in the gear-wheel 58b. As a consequence the drive from the first shaft 34 is transferred to only the gear-wheel 58b that has its pawl members 84 engaged therewith. The remaining pawl gear-wheels, for example 58a and 58c, may spin or rotate freely with respect to the first shaft 34 under the influence of the fixed gear-wheels 80 provided on the second shaft 60 and with which they form gear-wheel pairs. The driving of the first shaft 34 and imparted to the pawl gear-wheel 58b is subsequently transferred through the fixed gear-wheel 80 that forms the gear-wheel pair with the pawl gear-wheel 58b. It is envisaged that the gear-wheels may additionally be provided with a form of bearing means to facilitate their free rotation with respect to the shafts 34 and 60.

It will be necessary to provide appropriate mechanisms to allow changing of the rear wheel 32 of the bicycle 12 and such may require the bevel gear-wheel 70 to be removable. Such an arrangement may also allow interchanging of the bevel gear-wheel 70 with other similar gear-wheels of differing gearing to provide an entirely different gear range for the bicycle 12. It is further envisaged that some structures may be required to facilitate alignment of the guide and index cables although it is considered that existing mechanisms employed in respect of gear cables an bicycles may be suitable.

It is envisaged that a thin layer of metallic material may be provided coating the bore of each shaft adjacent the pawl gear-wheels Such a metallic coating will accentuate return of the pawl members to their seated position within the sheet and will help prevent movement thereof under centrifugal forces imparted by rotation of the shaft.

Further, a similar effect will be obtained through use of a magnet, less powerful than the roving magnet, in each pawl recess in each pawl gear-wheel. This magnet will be orientated in the same manner as the pawl members so as to repel same and return them to their seat within the shaft but will not prevent the movement of the pawl members to engage the pawl gear-wheel under the influence of the roving magnet.

Whilst the above embodiment of the improved gear system of the present invention has been described with reference to a bicycle gear system it is to be understood that other applications may be similarly appropriate without departing from the scope of the present invention. Further, the above embodiment has been described with reference to a pair of pawl members 84 provided in association with each pawl gear-wheel although it should be understood that other equivalent arrangements may prove equally useful. For example, it is envisaged that a single pawl gear-wheel may be provided with as many as three or more pawl members for engagement of the pawl gear-wheels.

It is still further envisaged that the improved gear system of the present invention may be accentuated through use of electrical energy to induce movement of the pawl members, for example by providing electromagnets within the shafts and associated with each pawl gear-wheel to replace the roving magnets. Supplying a current to a particular electromagnet will induce movement in associated pawl members to engage the pawl gear-wheel. Removing the current from the electromagnet resulting in return of the pawl member to the shaft.

It is anticipated that mechanical means may be provided for operation of the improved gear system of the present invention. For example, the pawl members may be provided with spring means to positively drive their release from the shaft upon contact with a bulbous member able to travel through the bore of the shaft, the bulbous member replacing the roving magnet.

Figure 6:
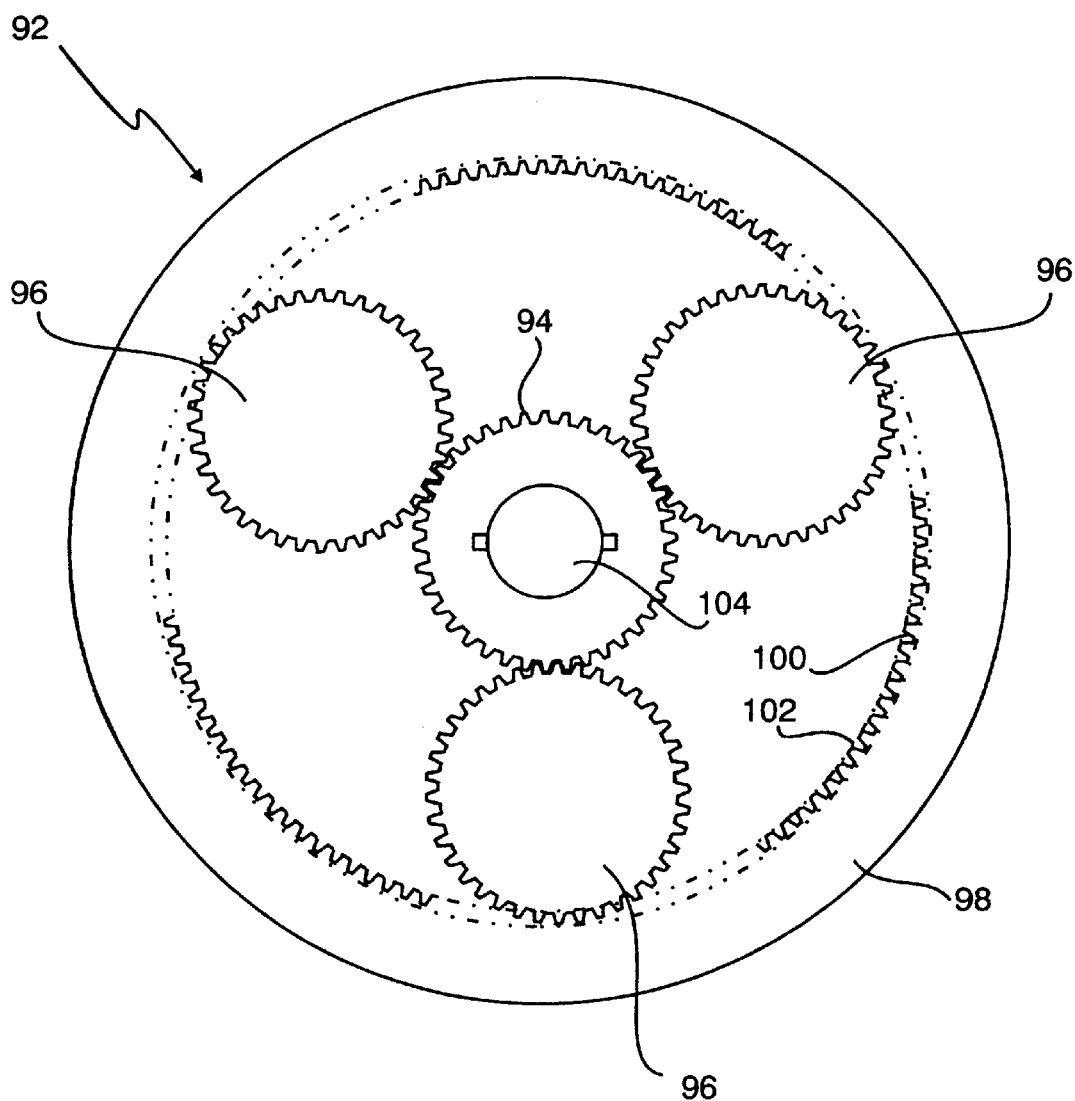
FIG. 6 is a cross sectional view of an improved gear system in accordance with a second embodiment of the present invention.

In FIG. 6, the improved gear system of the present invention applied to operation of an internal hub gear system employed in some bicycles and other geared conveyances. The internal hub gear system 92 employs a sun gear 94 about which are provided three planetary gears 96 within the hub 98. In turn, the hub 98 forms a ring gear 100 around its internal surface 102. An internal shaft 104 running longitudinally through the hub 98 is provided, the internal shaft 104 having provided thereabout a range of further sun gears (not shown) and corresponding planetary gears (not shown), each providing a different gear ratio within the ring gear 100. Each sun gear 94 has an internal surface arranged to accept therein one or more pawl members (not shown) provided in the internal shaft. Whether a particular pawl member is caused to engage the associated sun gear 94 is determined by the positioning of a roving magnet (not shown) provided within the internal shaft, in a substantially similar manner to that described in the previously described embodiment.

It is to be understood that it will be possible to provide movement of one or more pawl members not only from a shaft to engage a gear-wheel rotating thereabout as described above but to also provide pawl members within the or each gear-wheel that may be influenced to move to engage the shaft passing therethrough. In this manner it is possible to make use of magnetic attraction forces between the roving magnet and the magnetised pawl members to thereby effect engagement of the pawl members with the shaft.

Modifications and variations such as would be apparent to the skilled addressee are considered to fall within the scope of the present invention.

We claim:

1. A gear system characterized by:
   at least one gear-wheel about a shaft;
   said at least one gear wheel normally rotating freely with respect to the shaft passing therethrough;
   one of the shaft and at least one gear-wheel having at least one pawl member located therein, said at least one pawl member being caused to move into and out of engagement with the other of said respective gear wheel and the shaft passing therethrough and, the engagement of the at least one pawl member with the other of the respective gear-wheel and the shaft thereby causing the respective gear-wheel to rotate with the shaft wherein the engagement of the at least one pawl member is actuated at least in part magnetically.

2. A gear system as defined in claim 1 further characterized by:
   a roving magnet being provided within the shaft and the at least one pawl member being magnetised whereby positioning of the roving magnet directly alongside the respective pawl member causes that pawl member to be moved by the roving magnet and to project partially from one of the shaft and respective gear wheel into a recess provided in the other of the shaft and respective gear-wheel.

3. A gear system as defined in claim 2 further characterized by:
   at least a pair of pawl members being provided in the shaft for engagement with each of the gear-wheels associated therewith.

4. A gear system as defined in claim 1, further characterized by an electromagnet being provided within the shaft associated with at least one gear-wheel having a least one pawl member located therein, wherein the supply of current to the electromagnet associated with a gear-wheel having at least one pawl member located therein induces movement in the or each pawl member to engage that gear-wheel and thereby causing that gear to rotate with the shaft.

5. A gear system as defined in claim 1, further characterized by:
   each pawl member being provided with a spring device to positively drive their release from the shaft.

6. A gear system characterized by a pair of substantially parallel shafts, each shaft having provided thereabout at least two gear-wheels, at least one of the gear-wheels on each shaft being fixed with respect to its shaft and at least one gear wheel on each shaft being able to rotate freely thereabout, the gear-wheels on one shaft, being arranged so as to engage the gear-wheels on the other shaft, thereby forming gear-wheel pairs, wherein a rotary force applied to one shaft is transferred to the other shaft through the gear-wheels associated therewith and under the influence of a roving magnet provided within at least one of the shafts, the positioning of which is determined by a user, the respective roving magnet causing one or more pawl members provided in each respective shaft adjacent each free gear-wheel to move into and out of engagement therewith, the free gear-wheels being caused to rotate with the shaft when engaged by the respective pawl member associated therewith.

7. A gear system as defined in claim 6 further characterized by a free or pawl gear-wheel being provided on one shaft adjacent a fixed gear-wheel on the other shaft such that when the or each pawl member associated with that free gear-wheel are not engaged therewith, the free gear-wheel will be caused to rotate freely about the shaft about which it is provided.

8. A gear system as defined in claim 7 further characterized by:
   at least a proportion of the gear-wheel pairs comprised of gear-wheels of differing diameters so as to provide a gear ratio therebetween.

9. A gear system as defined in claim 7, further characterized in that the gear-wheels are provided in a housing or casing.

10. A gear system as defined in claim 9 further characterized by:
    the shafts being mounted in the housing by way of bearing means so as to be held rotatably with respect thereto.

11. A gear system as defined in claim 9 further characterized by each shaft being provided with a plurality of fixed gear-wheels and a plurality of pawl gear-wheels located thereabout.

12. A gear system according to claim 11, further characterized in that the roving magnets in each shaft having a guide cable attached thereto to enable a user to control the position thereof with respect to each shaft and the gear-wheels provided thereabout, which in turn allows the user to select the gear ratio to be employed between the two shafts.

13. A gear system as defined in claim 12 further characterized by the housing containing a volume of lubricant to lubricate the gear-wheels in operation.

14. A gear system as defined in claim 6, characterized in that each shaft is provided with a plurality of fixed gear-wheels and a plurality of pawl gear-wheels located thereabout.

15. A wheeled conveyance characterized by:

a pedal-crank and one or more driven wheels, a gear system connected between the pedal crank, one driven wheel, said gear system having a pair of substantially parallel shafts, each shaft having provided thereabout at least two gear-wheels, at least one of the gear-wheels on each shaft being fixed with respect to its shaft and at least one gear wheel on each shaft being able to rotate freely thereabout, the gear-wheels on one shaft being arranged so as to engage the gear wheels on the shaft, thereby forming gear-wheel pairs, wherein a rotary force applied to one shaft is transferred to the other shaft through the gear-wheels associated therewith and under the influence of a roving magnet provided within at least one of the shafts, the positioning of which is determined by a user, the respective roving causing one or more pawl members provided in each respective shaft adjacent each free gear-wheel to move into and out of engagement therewith, the free gear-wheels being caused to rotate with the shaft when engaged by the respective pawl member associated therewith, one of said shafts having a fixed gear-wheel provided at a free end thereof, this fixed gear-wheel cooperating directly or indirectly with a complementary gear-wheel provided with respect to the pedal-crank.

16. A wheeled conveyance as defined in claim 15 further characterized by the other shaft having at least one fixed gear-wheel provided at a free end thereof, the fixed gear-wheel cooperating directly with a complementary gear-wheel provided on or with respect to a hub of a driven wheel.

17. A wheeled conveyance characterized by:

at least one gear-wheel about a shaft;

said at least one gear wheel normally rotating freely with respect to the shaft passing therethrough;

one of the shaft and at least one gear-wheel having at least one pawl member located therein, said at least one pawl member being caused to move into and out of engagement with the other of said respective gear wheel and the shaft, passing therethrough and, the engagement of the at least one pawl member with the other of the respective gear-wheel and the shaft thereby causing the respective gear-wheel to rotate with the shaft, the gear system of said at least one gear wheel and said shaft arranged in an internal hub arrangement and the internal hub comprising the shaft projecting through two sun gears, there being provided about each sun gear at least three planetary gear, the planetary gears engaging a ring gear formed by or adjacent the hub, wherein the shaft contains at least a single pawl member associated with each sum gear and roving magnet, the positioning of the roving magnet being able to be determined by a user to cause the respective pawl member associated with a selected sun gear to engage therewith.

* * * * *

UNITED STATES PATENT AND TRADEMARK OFFICE
CERTIFICATE OF CORRECTION

PATENT NO.   : 6,065,361
DATED        : May 23, 2000
INVENTOR(S)  : William Wesley Martin & Mitchell Newton It is certified that error appears in the above-identified patent and that said Letters Patent is hereby corrected as shown below:

Title page, Item [57]

ABSTRACT:

Line 3, after "having" delete "as" and insert therein -- at --.
Line 7, after "(48)" delete "withing" and insert therein -- within --.

Column 3,
Line 32, after "the" delete "firm" and insert therein -- first --.
Line 50, after "thereto" delete "one and insert therein -- the --.

Column 4,
Line 16, after "is" delete "rot" and insert therein -- not --.
Line 59, after "gear-wheels" delete "22" and insert therein -- 82 --.
Line 63, after "58a and" delete "68c" and insert therein -- 58c --.

Column 5,
Line 48, after "gear" delete "ration" and insert therein -- ratio --.
Line 49, after "gear" delete "ration" and insert therein -- ratio --.

Column 6,
Line 28, after "similar" delete "gear-wheels" and insert therein -- gear wheels --.
Line 33, after "cables" delete "an" and insert therein -- on --.
Line 37, after "gear-wheels" insert -- . --.
Line 38, after "within the" delete "sheet" and insert therein -- shaft --.

Column 7,
Line 13, delete "applied" and insert "applies".

UNITED STATES PATENT AND TRADEMARK OFFICE
CERTIFICATE OF CORRECTION

PATENT NO. : 6,065,361
DATED : May 23, 2000
INVENTOR(S) : William Wesley Martin & Mitchell Newton It is certified that error appears in the above-identified patent and that said Letters Patent is hereby corrected as shown below:

Column 8,
Line 52, after "claim" delete "9" and insert therein -- 10 --.

Column 9,
Line 10, after "wheels on the" insert -- other --.
Line 17, after "roving" insert -- magnet --.

Column 10,
Line 1, after "at" insert -- or adjacent --.
Line 20, after "three planetary" delete "gear" and insert therein -- gears --.
Line 23, after "each" delete "sum" and insert therein -- sun --.

Signed and Sealed this

Twenty-fifth Day of September, 2001

*Attest:*

NICHOLAS P. GODICI
*Attesting Officer*    Acting Director of the United States Patent and Trademark Office